A. McNITT.
CHANGE SPEED GEAR.
APPLICATION FILED OCT. 23, 1919.
1,350,822.
Patented Aug. 24, 1920.
2 SHEETS—SHEET 1.
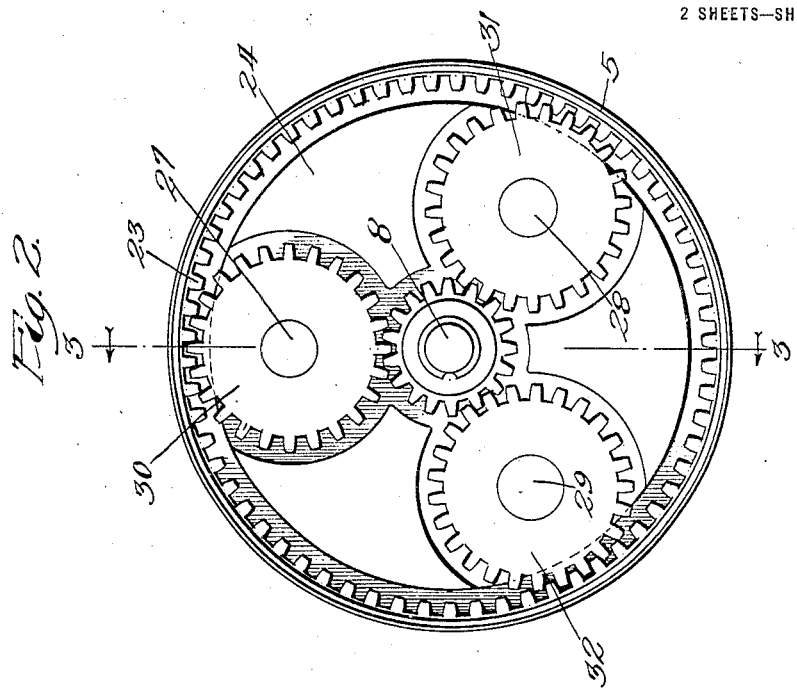
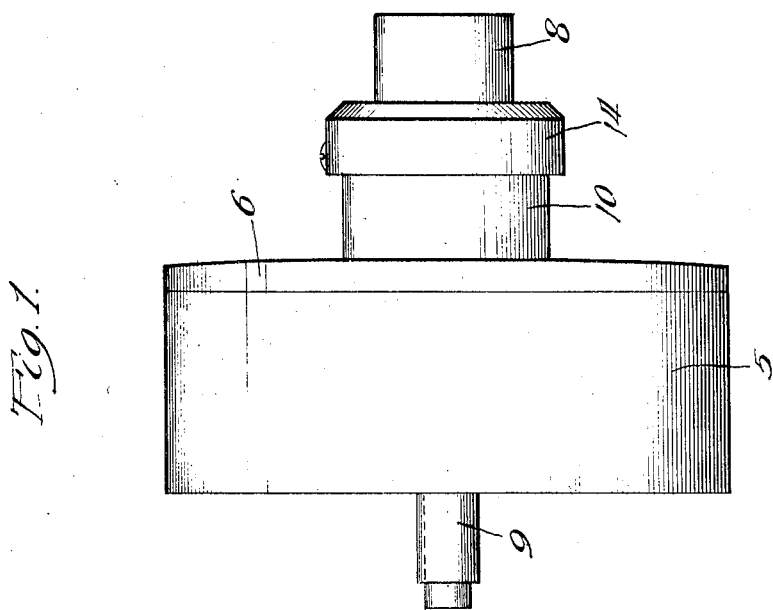

A. McNITT.
CHANGE SPEED GEAR.
APPLICATION FILED OCT. 23, 1919.
1,350,822.
Patented Aug. 24, 1920.
2 SHEETS—SHEET 2.
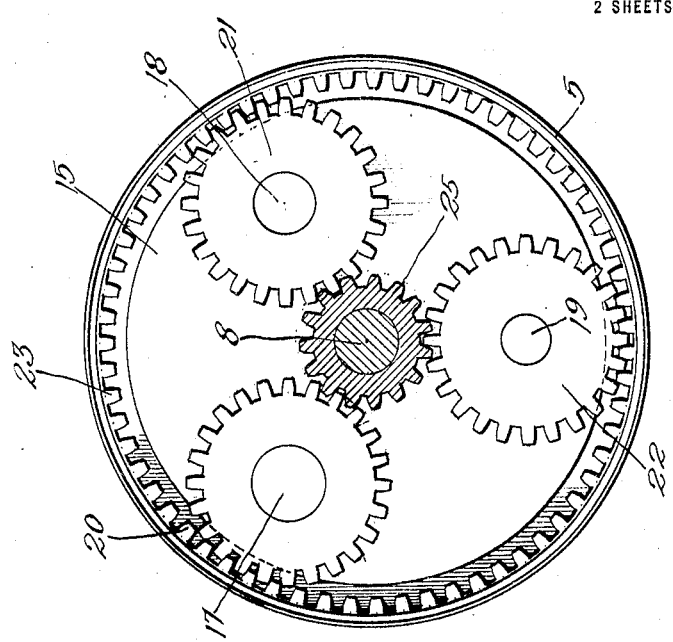
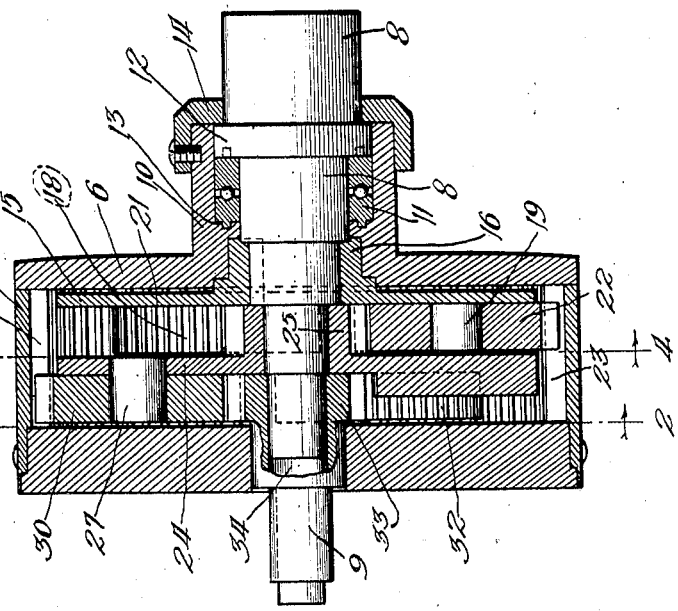
Witness:
Stephen Rebra
Inventor.
Archibald McNitt.

UNITED STATES PATENT OFFICE.

ARCHIBALD McNITT, OF BENTON HARBOR, MICHIGAN.

CHANGE-SPEED GEAR.

1,350,822.  Specification of Letters Patent.  Patented Aug. 24, 1920.

Application filed October 23, 1919. Serial No. 332,600.

*To all whom it may concern:*

Be it known that I, ARCHIBALD McNITT, a citizen of the United States, residing at Benton Harbor, in the county of Berrien and State of Michigan, have invented certain new and useful Improvements in Change-Speed Gears, of which the following is a specification.

This invention has to do with improvements in change speed gears. The change speed gear construction herein disclosed is for the purpose of effecting a speed change in given ratios between two shafts or other moving parts, and the change speed gears may be used for either increasing or decreasing the delivered speed as compared to the initial speed, depending upon the direction in which power is being delivered through the machine.

Devices of this kind are used in connection with many machines or appliances. Ordinarily they are used in those cases where a relatively large ratio of speeds is desired.

One of the objects of the present invention is to provide a change speed gear construction of such form and arrangement that very large speed ratios may be easily secured with a relatively smooth and quiet action of the gears themselves.

Another object is to provide an arrangement such that in those cases in which it is desired to secure relatively large speed transformation this may be done without the necessity of using gears of undesirably large size.

Another object of the invention is to provide a very compact and simple construction, so that it may be brought within a relatively small volume or space, and may be made of small weight. Another object is to simplify the construction of the machine and embody as much as possible the use of relatively simple mechanical parts, so that they can be cheaply manufactured and assembled.

Other objects and uses of the invention will appear from a detailed description of the same which consists in the features of construction and combinations of parts hereinafter described and claimed.

In the drawings:

Figure 1 shows a side elevation of a machine embodying the features of the present invention;

Fig. 2 is a face view of the interior of the machine showing the first gear reduction, and may be considered as a section taken on the line 2—2 of Fig. 3, looking in the direction of the arrows;

Fig. 3 is a vertical cross section through the machine; and

Fig. 4 is a cross section through the interior of the machine showing the second gear reduction and may be considered as taken on the line 4—4 of Fig. 3, looking in the direction of the arrows.

The machine illustrated in the drawings includes a circular casing 5 in combination with end heads 6 and 7 and a suitable mechanism on the interior of the casing. The head 6 constitutes a permanent portion of the casing 5 or may be independently attached thereto as desired.

Extending through the head 6 is a low speed shaft 8 and extending through the head 7 is a high speed shaft 9. The low speed shaft 8 is journaled within a neck or extension 10 on the head 6, and in those cases in which it is desired to do so there may be provided a thrust bearing within said neck 10. The thrust bearing illustrated in the drawing is located between a flange 12 on the low speed shaft and a shoulder 13 on the head 6. A cap 14 secured to the neck 10 may be provided for engaging the outside face of the flange 12 in order to prevent the low speed shaft from pulling out of the machine.

A flange plate located on the interior of the casing is provided with a neck 16 which may be keyed to the inwardly extending portion of the low speed shaft, so that said flange plate and the low speed shaft are compelled to rotate in unison. This flange plate 15 carries a number of studs 17, 18, and 19 on which are journaled the gears 20, 21, and 22 respectively. The interior of the casing 5 is provided with an inwardly projecting annular gear 23 with which the gears 20, 21, and 22 mesh.

In advance of the gears 20, 21, and 22 is another flange plate 24 having a bearing neck 25 journaled on a suitable element. A convenient form of construction is that illustrated in the drawings in which the low speed shaft is continued forward, preferably of reduced size as illustrated, to provide a bearing for the collar 25. The outside face of the collar is provided with teeth 26, so that it constitutes in effect a pinion, and said teeth mesh simultaneously with the gears 20, 21, and 22.

The flanged plate 24 in turn carries a series of studs 27, 28, and 29 on which are journaled the gears 30, 31, and 32. The interior of the casing 5 is provided with an annular gear with which the gears 30, 31 and 32 mesh, and a convenient form of construction is that illustrated in the drawings in which the teeth of the aforementioned annular gear 23 also constitute the teeth of the annular gear with which the gears 30, 31, and 32 are meshed.

The high speed shaft 9 is provided on its inner end with a pinion 33 which meshes simultaneously with the gears 30, 31, and 32. The high speed shaft and the said pinion may be journaled in any suitable manner, but a convenient form of construction is that illustrated in the drawings in which the inner portion of the said pinion and high speed shaft are socketed as at 34 to receive an extension of the low speed shaft on which they are journaled. The high speed shaft may also be journaled in the head 7.

The operation of this machine is as follows: Assuming that power is being transmitted from the high speed to the low speed shaft, and that it is desired to reduce speed, and assuming also that the casing 5 is held stationary, the rotation of the high speed shaft and pinion 33 will cause the flanged plate 24 to travel in the same direction, as the high speed shaft, but at a speed reduced in the exact ratio of the number of teeth on the pinion 33 as compared to the number of teeth in the annular gear with which the gears 30, 31, and 32 are meshing. This ratio may be, for example, one to five, in which case the flanged plate 24 will travel at one-fifth the speed of the high speed shaft. The pinion 25 will, of course, travel at the same speed as the flanged plate 24, and this will cause the flanged plate 15 and low speed shaft to travel at a speed depending upon the exact ratio of the number of teeth of the pinion 25 as compared with the annular gear with which the gears 20, 21 and 22 are meshed. This ratio may be, for example, one to five, in which case the low speed shaft will travel at one-fifth of the speed of the pinion 25. Such an arrangement will give an overall reduction of speed from the high speed to the low speed shaft of twenty-five to one.

It will be evident that, if desired, the speed change might be indefinitely multiplied or divided by the use of supplemental or additional reductions, but the illustrations above given will suffice to show the principle of operation contemplated in my invention.

While I have herein shown and described only a single embodiment of the features of my invention, still I do not limit myself to the same, except as I may do so in the claims.

I claim:

1. In a change speed device, the combination of a cylindrical chamber, a stationary annular gear on the inner cylindrical surface of the same, a closure for the back end of said casing, a removable closure for the front end of the casing, a bearing in the back closure, a slow speed shaft journaled in said bearing and projecting forwardly through the cylindrical portion of the casing, a disk secured to said shaft adjacent to the back closure, a plurality of pinions journaled on the front face of said disk and respectively engaging the annular gear on the casing, a disk journaled on the forwardly projecting portion of the slow speed shaft, a pinion connected to the back face of said disk and meshing with all of the pinions on the first mentioned disk, a plurality of pinions journaled on the front face of the second mentioned disk, all of said pinions meshing with the annular gear of the casing, a high speed shaft journaled in the removable head of the casing, the inner ends of the high and low speed shafts being journaled together, and a pinion on said high speed shaft meshing simultaneously with all of the pinions of the second mentioned plurality of pinions, substantially as described.

2. In a change speed device, the combination of alined high and low speed shafts, a journaled connection between the inner ends of said shafts, an annular gear surrounding and concentric with said shafts, a disk secured to the low speed shaft, a plurality of pinions journaled on said disk and carried thereby and meshing with the annular gear, a pinion concentric with respect to the shafts and meshing with all of the pinions aforesaid, and a driving connection between the concentric pinion and the high speed shaft substantially as described.

ARCHIBALD McNITT.